Patented Mar. 17, 1925.

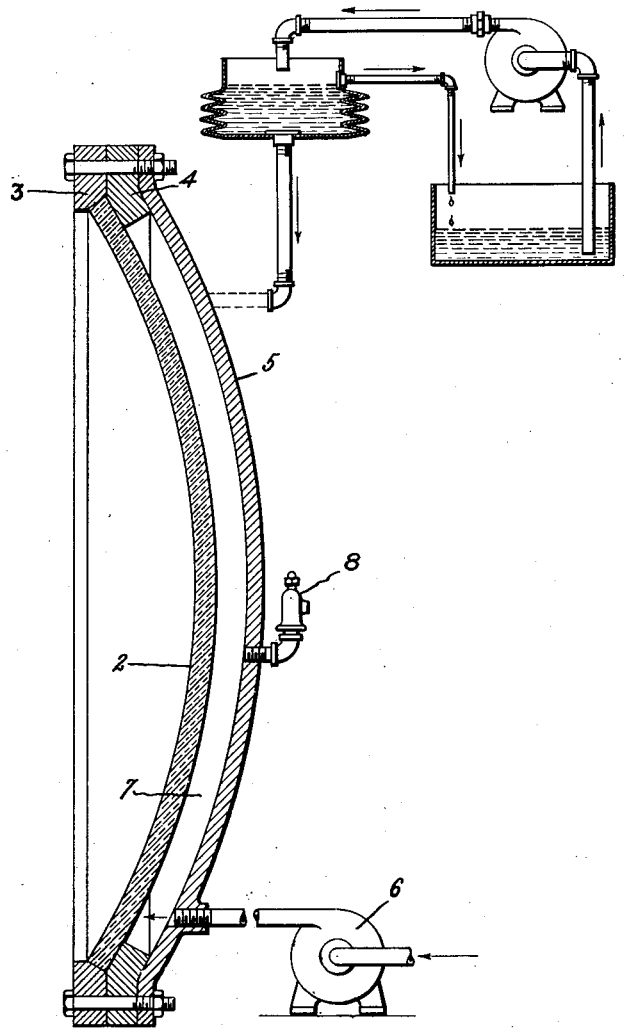

1,530,441

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

MIRROR.

Application filed October 30, 1922. Serial No. 597,963.

*To all whom it may concern:*

Be it known that I, ELIHU THOMSON, a citizen of the United States, residing at Swampscott, county of Essex, State of Massachusetts, have invented certain new and useful Improvements in Mirrors, of which the following is a specification.

My invention relates to mirrors, more particularly it relates to mirrors especially adapted for use in connection with sources of light of very high intensity and which produce a large amount of heat.

As is well known large mirrors when used in connection with high intensity sources such as the Beck arc very often crack.

Among the objects of my invention are the following: to produce a mirror so protected and reinforced as to minimize the danger of cracking when used in connection with light sources of the above character and to provide other details of improvement tending to increase the efficiency and serviceability of the mirror of the above character.

The means for accomplishing the objects of my invention are hereinafter more fully set forth and claimed, reference being had to the accompanying drawing which shows the mirror in sectional elevation.

Referring more in detail to the drawing, it will be seen that the mirror 2 is provided with a reinforcing band 3 which may be of any suitable material such as iron, brass or copper, for example. This band may be of course formed in any suitable manner, as by spinning, for example. This band may be extended down along the back of the mirror to any suitable distance. In the drawing, I have shown the flange 4 extending down only a short distance. In certain cases, packing material may be interposed between the band 3 and the mirror; for example, if the band 3 is to be made of a metal such as iron, aluminum or steel, a suitable packing such as copper or cement may be interposed between the band 3 and the mirror 2. Under certain conditions as hereinafter pointed out, it may be satisfactory to use a non-metallic packing. Secured to the band 3 I have shown a head 5 which may be secured to the band in any suitable manner. Between the head 5 and the mirror 2 there is a space which is intended for holding a fluid under pressure. This fluid may be either gaseous or liquid. In the event that a gaseous fluid is used, I contemplate the use of a pump 6 for maintaining a constant pressure of the gas into the chamber 7 between the head 5 and the mirror 2. I also contemplate providing a valve 8 by means of which the pressure in the chamber 7 is maintained constant, the valve being set so that the gas will escape when the pressure in the chamber reaches any maximum desired. In the event that I use a fluid such as water or mercury, I contemplate providing a suitable fluid head as indicated in the upper part of the drawing which fluid head is shown connected by dotted lines with the head 5. It will be understood that I contemplate using in connection with the liquid pressure medium an air chamber in place of the head and a pressure valve similar to valve 8 together with a pump similar to the pump 6 in order to maintain a constant pressure in the chamber. Of course, the connection between the pump and the mirror may be flexible if desired.

With the construction shown and described, I produce a mirror which is free from the usual liability to crack inasmuch as the metal band 3 not only acts as a compressing force around the circumference of the mirror offsetting to a certain extent the expanding force of the heat but this band at the same time acts to a degree as a heat distributor and heat disseminator. The same is true with respect to the fluid medium which is circulated through the chamber 7.

It will be understood that the reinforcing band alone may be used without the head in which case the fluid medium must be dispensed with. Under these conditions the width of the band on the back of the reflector will vary with the intensity of the heat developed by the light source and with the character of the glass. When the head is used together with the circulating fluid medium the band may be narrow. Under these conditions a non-metallic packing may be interposed between the metal band and the mirror if desired, inasmuch as the fluid medium operates to generally distribute and disseminate the heat imparted to the mirror. The chief function of the pressure on the fluid medium is to keep the glass of the mirror under a state of peripheral and body compression in opposition to a force which would cause a crack by unequal heating. The material of the mirror is pressed up in such a way that if it were slightly plastic any crack or crevice would be closed and kept closed. Any pressure such as that of springs suitably placed at the back of the mirror may serve the purpose, but is more difficult to adjust. The fluid medium operates as a heat disseminating medium, and also serves as a reinforcing means operating in opposition to the expanding force due to the heat. This fluid medium operates to compress the mirror generally and evenly from the rear and of course assists the compressing force exercised by the band.

The edge of the mirror is bound peripherally so that no crack can open or start from the edge—hence the mirror is safeguarded in all respects.

When the fluid used behind the mirror is mercury, the mercury itself may be used as the reflecting means in place of using a silvered glass. In such a case, I contemplate making the space between the glass and the head as small as practical. In this way a minimum amount of mercury will be used. Of course the surface of the glass and the mercury must be clean. The circulating operation of the mercury to keep the glass cool must not cause any foreign material to come into the fluid. Therefore the apparatus must be kept closed up or sealed up in such a way as to keep out anything like dirt or dust. The glass may of course be made as thick as necessary to withstand the pressure from the rear.

What I claim as new and desire to secure by Letters Patent of the United States, is,—

1. In combination with a mirror a constricting band about the circumference and a head behind said mirror secured to said band and a fluid contained cavity between the mirror and the head and means for causing a circulation of said fluid and for maintaining the same at a constant pressure, said means including a pressure regulator.

2. In combination with a mirror, means under circulation for maintaining the mirror under pressure from the rear and for disseminating heat from the mirror.

3. In combination with a mirror, metallic means under circulation for maintaining the mirror under pressure and for disseminating heat from the mirror.

In witness whereof, I have hereunto set my hand this 27th day of October, 1922.

ELIHU THOMSON.